(12) United States Patent
Sleewaegen

(10) Patent No.: US 7,205,935 B2
(45) Date of Patent: Apr. 17, 2007

(54) METHOD AND APPARATUS FOR PROCESSING SIGNALS FOR RANGING APPLICATIONS

(75) Inventor: Jean-Marie Sleewaegen, Jette (BE)

(73) Assignee: Septentrio N.V., Leuven (BE)

( * ) Notice: Subject to any disclaimer, the term of this patent is extended or adjusted under 35 U.S.C. 154(b) by 250 days.

(21) Appl. No.: 10/772,722

(22) Filed: Feb. 4, 2004

(65) Prior Publication Data
US 2006/0133461 A1    Jun. 22, 2006

Related U.S. Application Data

(63) Continuation-in-part of application No. PCT/BE02/00136, filed on Aug. 7, 2002.

(30) Foreign Application Priority Data
Aug. 8, 2001    (EP) .................................. 01870171

(51) Int. Cl.
  *G01S 5/14*     (2006.01)
  *H04B 1/00*     (2006.01)
(52) U.S. Cl. .................................. 342/357.12; 375/148
(58) Field of Classification Search ........... 342/357.12; 375/148
  See application file for complete search history.

(56) References Cited

U.S. PATENT DOCUMENTS

| 5,390,207 | A | 2/1995 | Fenton et al. |
| 5,414,729 | A | 5/1995 | Fenton |
| 5,615,232 | A * | 3/1997 | Van Nee ..................... 375/346 |
| 5,734,674 | A | 3/1998 | Fenton et al. |
| 5,781,152 | A | 7/1998 | Renard et al. |
| 5,809,064 | A | 9/1998 | Fenton et al. |
| 5,901,183 | A | 5/1999 | Garin et al. |
| 5,918,161 | A * | 6/1999 | Kumar et al. .................. 455/65 |
| 5,953,367 | A | 9/1999 | Zhodzicshsky et al. |

(Continued)

FOREIGN PATENT DOCUMENTS

WO    WO 95/14937    6/1995

OTHER PUBLICATIONS

Ray, J. K. et al, "GPS Code and Carrier Multipath Mitigation Using a Multiantenna System," IEEE Trans. on Aerospace and Electronic Systems, vol. 37, No. 1, Jan. 2001, pp. 183-195.*

(Continued)

*Primary Examiner*—Gregory C. Issing
(74) *Attorney, Agent, or Firm*—Merchant & Gould P.C.

(57) ABSTRACT

The present invention is related to a method and apparatus for processing a signal sent by a transmitter to a receiver, in particular for ranging applications. The signal is typically sent by a satellite, and comprises a carrier signal, modulated by at least one pseudo random noise code and a navigation signal. The method of the invention comprises a step of estimating the multipath error at each calculation of the range. The estimation is done by a multipath estimator module (23) on the basis of a predefined formula, said formula being a linear combination of said correlation values. Said formula is based on the calculation of at least four correlation values between at least four different versions of the PRN code and the PRN encoded signal sent by the transmitter. All except two of the coefficients used in the linear combination may be set to zero.

19 Claims, 8 Drawing Sheets

U.S. PATENT DOCUMENTS

| | | | |
|---|---|---|---|
| 5,966,403 A | | 10/1999 | Pon |
| 6,031,882 A | * | 2/2000 | Enge et al. .................. 375/343 |
| 6,252,863 B1 | * | 6/2001 | Raby et al. .................. 370/335 |
| 6,658,048 B1 | * | 12/2003 | Valio ........................... 375/150 |
| 6,917,644 B2 | * | 7/2005 | Cahn et al. .................. 375/142 |
| 6,987,820 B1 | * | 1/2006 | Brenner ....................... 375/343 |

OTHER PUBLICATIONS

Sleewaegen, Jean-Marie "Multipath Mitigation, Benefits from using the Signal-to-Noise Ratio" Proceedings of the 1997 10th International Technical Meeting of the Satellite Division of the Institute of Navigation, Sep. 16-19, 1997, pp. 531-540.

* cited by examiner

FIG. 1

PRIOR ART

PRIOR ART

METHOD AND APPARATUS FOR PROCESSING SIGNALS FOR RANGING APPLICATIONS

This application is a Continuation-in-Part of PCT application PCT/BE02/00136, filed Aug. 7, 2002, which application(s) are incorporated herein by reference.

FIELD OF THE INVENTION

The present invention is related to a method and apparatus for receiving and processing signals, essentially signals of the spread spectrum type, such as are used in the Global Positioning System (GPS).

STATE OF THE ART

Today, satellite based positioning systems are widely in use. Most known are the Global Positioning System (GPS) developed by the United States Government or the Global Navigation Satellite System (GLONASS) developed by the Russian Government. The primary purpose of these systems is to provide position, velocity and time to any user on or near the Earth's surface. The user determines his position in space and time by measuring his range to at least 4 satellites whose position and time are accurately determined, the range being defined as the distance between the user and a satellite.

The GPS satellites transmit signals on two carrier frequencies called L1 at 1575.42 MHz and L2 at 1227.6 MHz. The carriers are modulated by pseudo-random (PRN) spreading codes that are unique to each satellite, and by a navigation message. All satellites transmit at the same frequencies. The separation between the satellites is possible because all the PRN codes are chosen to be orthogonal.

The L1 carrier is modulated by the so-called coarse/acquisition code ("C/A-code") and the precision code ("P-code"). The C/A-code has a chipping rate of 1.023 MHz and a length of 1 ms, thus it contains 1023 chips (the term "chip" is used for the code symbols). The same 1023 chips are repeated every millisecond. The P-code has a chipping rate of 10.23 MHz and a length of 1 week. The same pattern is thus repeated every week. The L2 carrier is modulated only by the P-code. The signal bandwidth at L1 and L2 is limited in the satellite to the main lobe of the P-code spectrum, i.e. 20.46 MHz.

In addition to the PRN code modulation, each of the carriers is also modulated by a 50-Hz navigation message, conveying all the necessary parameters to compute the satellite position and time.

Signal tracking involves synchronising local replicas of the carrier and PRN codes of the satellite to be tracked with the incoming carrier and PRN codes from that satellite. This means that the receiver must have the ability to generate the PRN codes of all the satellites. Signal tracking is achieved by continuously modifying the phase and frequency of the carrier replica and delaying or advancing the code replica in order to maintain them locked on the incoming signal. Carrier tracking is accomplished in a phase lock loop (PLL), while code tracking is performed by a delay lock loop (DLL). By definition, when synchronisation is achieved, the phase of the carrier replica is the same as the incoming carrier phase, and the delay that had to be applied to the code replica is the same as that of the incoming code.

The range measurement by a GPS receiver is based on the measurement of that delay, which is a direct measure of the signal travel time from the satellite to the receiver. By multiplying the delay by the speed of light, the receiver computes its range to the satellite.

Several error sources influence the accuracy of the satellite range measurement. One of the most cumbersome of them is the multipath error. Multipath is a special type of interference where the received signal is composed of the desired line-of-sight signal, and one or more constituents which have traversed slightly different paths due to reflections on surfaces or objects in the antenna surroundings. Multipath signals arrive at the receiver with a different delay, phase and power than the line-of-sight signal.

The ranging error due to multipath depends on the delay, phase and power of the multipath signal with respect to the line-of-sight signal, and on the type of signal processing the receiver uses. Several digital processing techniques have been devised to reduce the effect of multipath on the ranging measurements.

However, a common drawback of the available multipath mitigation methods is that they are not able to reduce multipath having a short delay. Even for the most recent multipath error mitigation techniques, multipath arriving at the receiver with a delay of less than around 20 m affect the range measurement as if no mitigation technique were used at all. This is a serious limitation of the current techniques because in real life situations, most of the multipath signals are of short delay type.

Document U.S. Pat. No. 5,390,207 is related to a receiver for pseudorandom noise encoded signals. The operation of the device is based on narrowing the early-late spacing, to a fraction of a PRN code chip time, in order to mitigate multipath errors. The use of early-late correlators is a known technique for locking onto an incoming PRN code, and the early-late spacing, i.e. the time spacing between early and late versions of the local PRN code is an important parameter when it comes to multipath error mitigation. The exact definition of this term is given in the next paragraph.

Document U.S. Pat. No. 5,734,674 is equally related to a receiver for PRN encoded signals; the receiver described in this document has the capability of dynamically adjusting the early-late spacing between correlation signals.

Document U.S. Pat. No. 5,809,064 is related to improvements to the same type of receiver as described in U.S. Pat. No. 5,734,674, and equally based on dynamically adjusting early-late spacing.

All techniques related to adjusting and essentially reducing the early-late spacing are linked to a modification of the DLL discriminator. A general name for these techniques is 'narrow spacing', as opposed to techniques wherein no multipath error mitigation takes place ('wide spacing' techniques). It is found that prior art 'narrow spacing' techniques reduce the maximum range error with a factor 10 compared to 'wide spacing' techniques. However, an important multipath error remains for a wide range of multipath delays.

Document U.S. Pat. No. 5,414,729 is related to a receiver for PRN encoded signals, wherein a plurality of correlation signals are fed to a parameter estimator, from which the delay, amplitude and phase parameters of the direct path signal, as well as any multipath signals, may be estimated. This estimation however takes place by solving a system of equations, for example through a least-squares calculation, which requires complex and expensive hardware and software capabilities.

Document U.S. Pat. No. 5,953,367 is related to a receiver for PRN encoded signals, comprising a plurality of DLL correlators provided in each of the receiver's multiple processing channels. These correlators are combined in such a way as to build a DLL discriminator which is not affected by most of the multipath errors. This improves the tracking in the presence of multipath, but requires a significant modification of the DLL architecture, in comparison to wide spacing and narrow spacing DLL's.

Document U.S. Pat. No. 5,901,183 is related to a receiver for PRN encoded signals, wherein both the receiver DLL code and PLL carrier loops include a loop component that senses an error in its main loop caused by the presence of a multipath signal. A compound correlator loop is formed of a primary correlator and a secondary correlator that senses and corrects for multipath induced tracking error of the primary correlator.

Document U.S. Pat. No. 5,781,152 is related to a method wherein four pseudo random code replicas are used, namely a first set of early and late codes, with a first early-late spacing 2 d, and a second set with a second early-late spacing 2 kd. The multipath error is estimated from an extrapolation on the basis of correlation values measured with these two sets of codes.

Document U.S. Pat. No. 5,966,403 is related to a method and apparatus for minimizing the residual multipath distortion signal present in a received signal, by using a non-uniform weighting function for said estimation/minimization.

Figure 1:
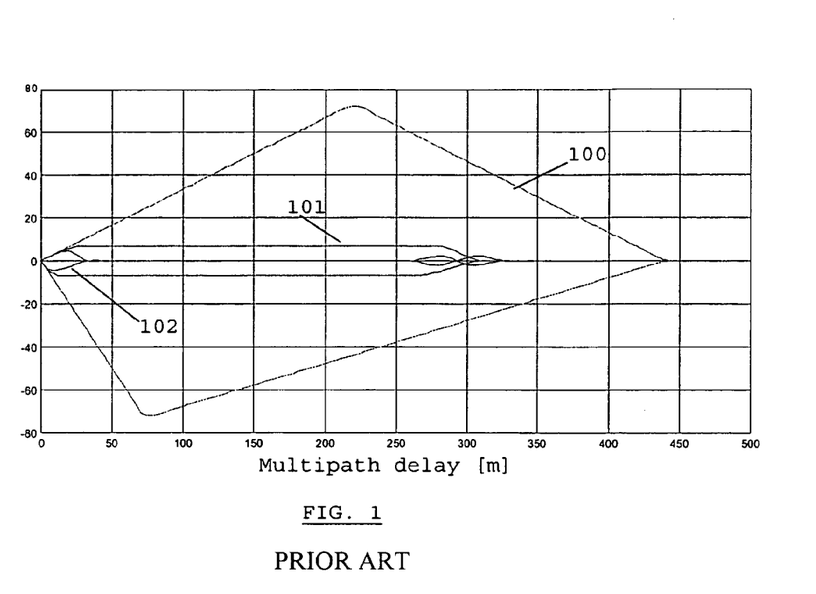
FIG. 1 illustrates the ranging error envelopes for prior signal processing techniques.

An overview of the capabilities and limitations of prior art methods is given in FIG. 1. The graph shows the range error envelope for three different signal processing techniques. Each envelope represents the maximum and minimum range error as a function of the multipath signal delay, for a given signal-to-multipath power ratio; in this case this ratio is equal to 4. The curve 100 refers to 'wide spacing' techniques, i.e. techniques wherein no multipath mitigation is employed. The curve 101 is valid for the 'narrow spacing' techniques referred to above, while the curve 102 corresponds to the techniques described earlier as representing the closest prior art. It is clear that no prior art technique is capable of reducing multipath errors at the lowest multipath delays (0–20 m).

AIMS OF THE INVENTION

The present invention aims to provide a method and a device for receiving and processing signals of the spread spectrum type, allowing a reduction of multipath errors in the lowest range of multipath delays, said reduction being in comparison to the closest prior art.

The present invention further aims to propose a method and device which are technically straightforward and inexpensive compared to existing methods and devices.

SUMMARY OF THE INVENTION

The present invention is related to a method for processing at least one signal sent by a transmitter, said signal preferably being used for measuring the range, i.e. the distance between said transmitter and a receiver, said signal comprising a carrier signal modulated by a pseudo random noise (PRN) code, said method comprising the steps of:

mixing said signal with a replica of the carrier signal, to acquire a baseband signal, representing said PRN code, multiplying said baseband signal respectively with M+N+1 PRN code replica's ($P_{-M}, \ldots, P_{+N}$), said replica's being shifted in time with respect to each other, the value M+N+1 being at least equal to four, one of said replica's being the punctual replica $P_0$, calculating the M+N+1 correlation values ($I_{-M}, \ldots, I_{+N}$) of said baseband signal with respect to each of said M+N+1 PRN code replica's, calculating from said M+N+1 correlation values ($I_{-M}, \ldots, I_{+N}$), an estimate of the multipath error, said calculation being based on a predefined formula, equating said multipath error to a predefined function of said M+N+1 correlation values ($I_{-M}, \ldots, I_{+N}$), wherein said predefined formula is a linear combination of said M+N+1 correlation values ($I_{-M}, \ldots, I_{+N}$), each of said values being normalized by the correlation value $I_0$ of said punctual replica $P_0$.

According to the preferred embodiment, the method of the invention comprises the steps of:

mixing said signal with a replica of the carrier signal, to acquire a baseband signal, representing said PRN code, multiplying said baseband signal respectively with three equally spaced replica's ($P_0, P_{-1}, P_{+1}$) of said PRN code, namely an early ($P_{-1}$), punctual ($P_0$) and late ($P_{+1}$) replica, with a given early-late spacing (d), multiplying said baseband signal with at least one additional replica of said PRN code, said additional replica being shifted in time relative to said early, late and punctual replica's, so that in total M+N+1 code replica's are used, M+N+1 being at least equal to four, calculating the M+N+1 correlation values ($I_{-M}, \ldots, I_{+N}$) of said baseband signal with respect to each of the M+N+1 PRN code replica's, locking the punctual code ($P_0$) to the baseband signal by keeping the two correlation values ($I_{-1}, I_{+1}$) between said baseband signal and said early and late replica's ($P_{-1}, P_{+1}$) equal to each other, calculating the range by multiplying the delay of the punctual code ($P_0$) by the speed of light, calculating from said M+N+1 correlation values ($I_{-M}, \ldots, I_{+N}$), an estimate of the multipath error, said calculation being based on said predefined formula, filtering said estimate of the multipath error and subtracting said estimate of the multipath error from said calculated range, yielding a corrected range value.

In the method of the invention, said linear combination preferably has of the following form:

$$MP = \sum_{i=-M\ldots N} \alpha_i \frac{1}{I_0} \frac{I_i}{1-|i|\frac{d}{2}}$$

wherein MP represents the multipath error, d represents the early-late spacing, $I_0$ represents the correlation value of said punctual replica, $I_{-M}, \ldots, I_{+N}$ represent the correlation values, $\alpha_i$ represent M+N+1 fixed values.

Preferably, every one of said M+N+1 replica's is shifted over the same time delay with respect to the next and/or previous replica.

Further according to a preferred embodiment, said $\alpha_i$ values are calculated according to the method comprising the steps of:

simulating, for a fixed signal-to-multipath amplitude ratio and for different multipath delays: the multipath range error and M+N+1 correlation values, using said simulated range errors and correlation values to obtain a system of equations, each equation equating the simulated multipath range error to a linear combination of the M+N+1 correlation values, obtaining said $\alpha_i$ values by solving said system of equations.

In this method, all except two of said $\alpha_i$ values may be set to zero.

According to a further preferred embodiment, said $\alpha_i$ values are calculated according to the method comprising the steps of:

for a given signal-to-multipath SMR and for a given number D of multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ of said punctual replica $P_0$, to obtain a (2D×(M+N+1)) matrix C, calculating the $\alpha_i$ values by solving the system of equations: y=C·α., wherein α is a vector comprising the M+N+1 $\alpha_i$ values.

The vector α may be overdetermined by said system of equations in which case said vector α is obtained by an optimization technique.

According to a particular embodiment, two replica's are used in the estimation of the multipath error, and the early-late spacing d is 1/15 of a chip length, and the second replica $P_{+2}$ is 1/15 of a chip length later than said punctual replica $P_0$, and said multipath error estimation MP is calculated as:

$$MP = -0.42 \cdot \left(1 - \frac{I_{+2}}{I_0} \frac{1}{1-d}\right)$$

The invention is equally related to a receiver for ranging applications, said receiver comprising a plurality of channels for detecting and locking onto a plurality of PRN encoded signals, each channel comprising:

a delay line, comprising M+N+1 taps, M+N+1 being at least four, for obtaining M+N+1 PRN codes, one of which is a punctual code $P_0$, one a first early code P−1, and one a late code P+1, with an early-late spacing d between the early and late code, M+N+1 mixers and M+N+1 accumulators to calculate M+N+1 correlation values ($I_{-M}$, ..., $I_{+N}$), a multipath estimator module to calculate a multipath error estimate MP, according to a predefined formula, said formula being a linear combination of said M+N+1 correlation values ($I_{-M}$, ..., $I_{+N}$), each of said values being normalized by the correlation value $I_0$ of said punctual replica $P_0$, a low pass filter.

In a receiver according to the invention, said formula preferably has the form:

$$MP = \sum_{i=-M...N} \alpha_i \frac{1}{I_0} \frac{I_i}{1-|i|\frac{d}{2}}$$

wherein MP represents the multipath error, d represents the early-late spacing, $I_0$ represents the correlation value of said punctual replica, $I_{-M}$, ..., $I_{+N}$ represent the correlation values, $\alpha_i$ represent M+N+1 fixed values.

In a receiver according to the invention, said $\alpha_i$ values are preferably calculated according to the method comprising the steps of:

simulating, for a fixed signal-to-multipath amplitude ratio and for different multipath delays: the multipath range error and M+N+1 correlation values, using said simulated range errors and correlation values to obtain a system of equations, each equation equating the simulated multipath range error to a linear combination of the M+N+1 correlation values, obtaining said $\alpha_i$ values by solving said system of equations.

In this method, all except two of said $\alpha_i$ values may be set to zero.

According to a further preferred embodiment of the receiver of the invention, said $\alpha_i$ values are calculated according to the method comprising the steps of:

for a given signal-to-multipath SMR and for a given number D of multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ of said punctual replica $P_0$, to obtain a (2D×(M+N+1)) matrix C, calculating the $\alpha_i$ values by solving the system of equations: y=C·α., wherein α is a vector comprising the M+N+1 $\alpha_i$ values.

The vector α may be overdetermined by said system of equations, in which case said vector α is obtained by an optimization technique.

According to a preferred embodiment of the receiver of the invention, two replica's are used in the estimation of the multipath error, and the early-late spacing d is 1/15 of a chip length, and the second replica $P_{+2}$ is 1/15 of a chip length later than said punctual replica $P_0$, and said multipath error estimation MP is calculated as:

$$MP = -0.42 \cdot \left(1 - \frac{I_{+2}}{I_0} \frac{1}{1-d}\right)$$

In a receiver according to the invention, said multipath estimator module may comprise software means for calculating the multipath error estimate on the basis of a predefined formula.

Alternatively, in a receiver according to the invention, said multipath estimator module may comprise hardware means for calculating the multipath error estimate on the basis of a predefined formula.

The invention is equally related to a method for estimating a ranging error due to multipath in a receiver, said receiver comprising:

a delay line, comprising M+N+1 taps, M+N+1 being at least four, for obtaining M+N+1 PRN codes, one of which is a punctual code $P_0$, one an early code $P_{-1}$, and one a late code $P_{+1}$, with an early-late spacing d between the early and late code, M+N+1 mixers and accumulators to calculate M+N+1 correlation values ($I_{-M}$, ..., $I_{+N}$), a multipath estimator module to calculate a multipath error estimate MP, according to the formula:

$$MP = \sum_{i=-M...N} \alpha_i \frac{1}{I_0} \frac{I_i}{1-|i|\frac{d}{2}}$$

wherein MP represents the multipath error, d represents the early-late spacing, $I_0$ represents the correlation value of said punctual replica, $I_{-M}, \ldots, I_{+N}$ represent the correlation values, $\alpha_i$ represent M+N+1 fixed values, said method comprising the steps of:

simulating, for a fixed signal-to-multipath amplitude ratio and for different multipath delays: the multipath range error and M+N+1 correlation values, using said simulated range errors and correlation values to obtain a system of equations, each equation equating the simulated multipath range error to a linear combination of the M+N+1 correlation values, obtaining said $\alpha_i$ values by solving said system of equations. In this method, all except two of said $\alpha_i$ values may be set to zero.

According to a further embodiment, said method comprises the steps of:

for a given signal-to-multipath SMR and for a given number D of multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ of said punctual replica $P_0$, to obtain a (2D×(M+N+1)) matrix C, calculating the $\alpha_i$ values by solving the system of equations: y=C·α., wherein α is a vector comprising the M+N+1 $\alpha_i$ values.

DETAILED DESCRIPTION OF THE INVENTION

Figure 2:
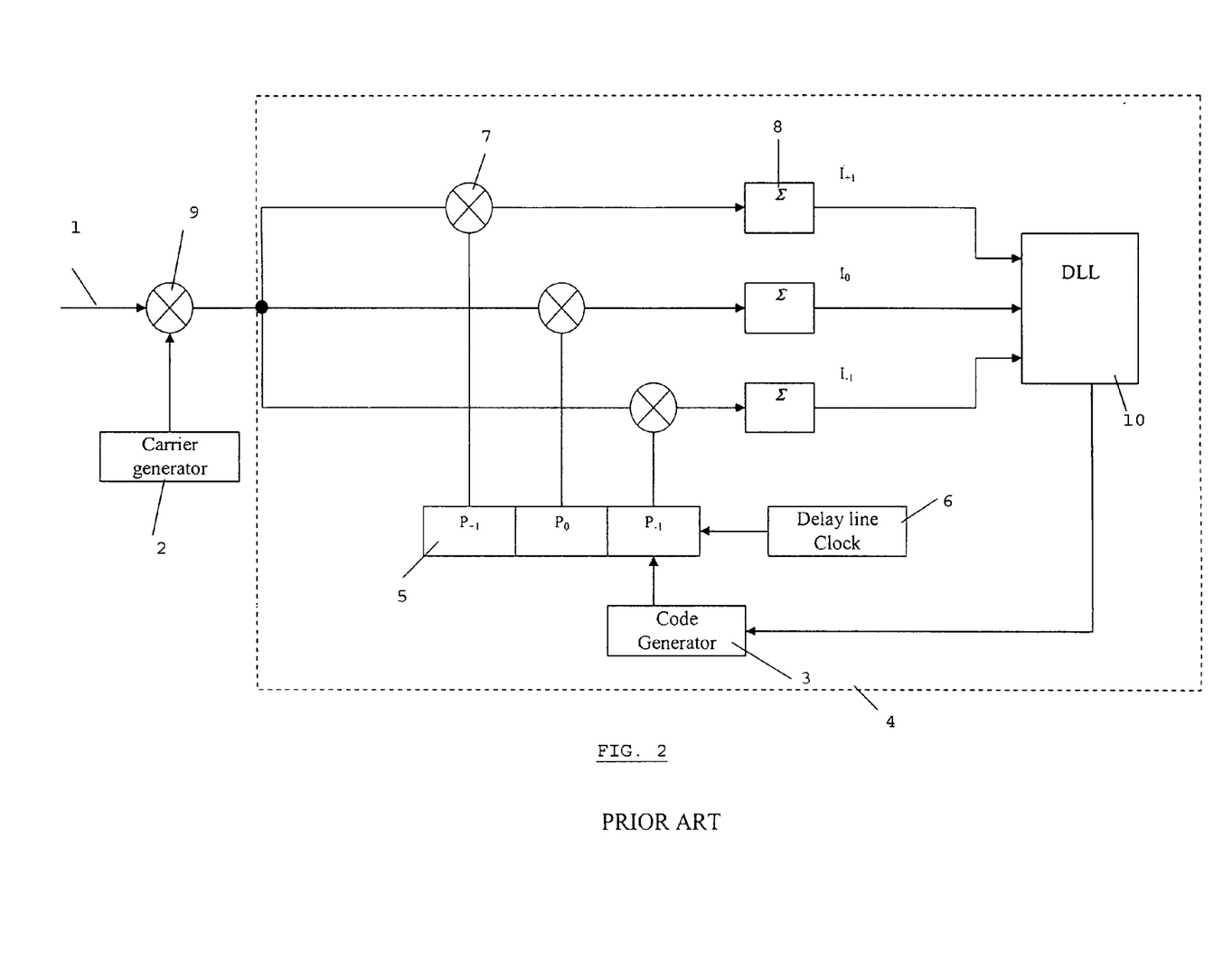
FIG. 2 illustrates the signal processing in a receiver for a ranging application according to the prior art.

A typical implementation of the signal processing technique according to the prior art for ranging applications is represented in FIG. 2. The incoming signal 1 is first mixed with a local replica of the carrier, produced by the carrier generator 2, in order to bring the signal to baseband. The frequency and phase of the local carrier are controlled by a PLL (not shown). The baseband signal essentially represents the PRN code, modulated by the 50 Hz navigation signal.

The delay lock loop is represented by the group of elements 4. As known in the art, an acquisition step is first performed in order to acquire a 'coarse' match between the incoming signal and a local version of the PRN code. After that, the local code needs to be locked onto the incoming signal. The present invention is related to this locking step.

Referring again to FIG. 2, the local PRN code is generated in the code generator 3 at a rate which is continuously controlled by the DLL discriminator and filter 10. The code enters a delay line 5 where three different code replicas are generated: $P_0$ is the punctual code replica, which has to be kept aligned with the incoming code. $P_{-1}$ is the early replica, which is advanced by a fraction of a chip with respect to $P_0$, and $P_{+1}$ is the late replica, delayed by a fraction of a chip with respect to $P_0$. The delay between any two adjacent taps in the delay line is the inverse of the frequency of the delay line clock 6, and is traditionally referred to as "d/2" in units of code chips.

For the GPS C/A-code, the code chip duration is close to 1 µs, and the chip length close to 293 m. The delay between the early and late taps is an important design parameter, which is referred to as the early-late spacing, and noted 'd'. Many receivers use a so-called "Wide spacing" of d=1 code chip. The spacing is said to be narrow if d is lower than 1 chip.

Figure 3A:
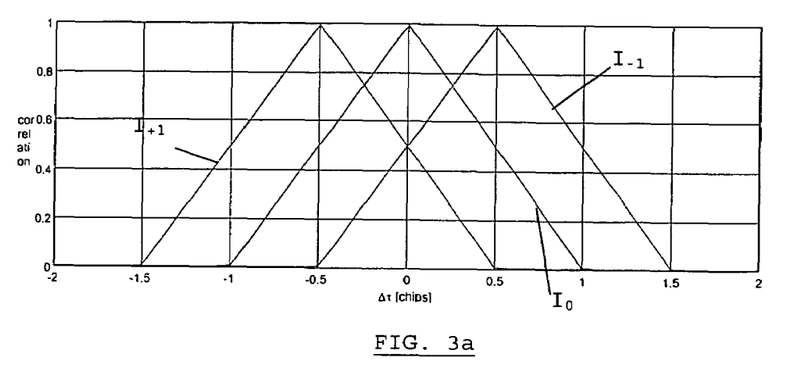
FIGS. 3a and 3b illustrate the effect of multipath errors on the tracking point in devices of the prior art.

Returning to FIG. 2, the multipliers 7 followed by the accumulators 8 compute the correlation between the baseband signals at the output of the carrier mixer 9 and each of the local code versions. The resulting three correlations $I_0$, $I_{-1}$ and $I_{+1}$ are represented in FIG. 3a as a function of the delay misalignment Δτ between the incoming code and the local punctual code ($P_0$). FIG. 3a corresponds to the case where no multipath signals are present. When Δτ is positive, the local punctual code is late with respect to the incoming code, and the early correlation ($I_{-1}$) is higher than the late correlation ($I_{+1}$) The opposite occurs when Δτ is negative. As can be expected, the correlation between the punctual and the incoming code ($I_0$) reaches its peak when they are aligned, i.e. when Δτ=0.

The role of the DLL 4 is to keep the punctual code $P_0$ aligned with the incoming code. It is apparent from the FIG. 3a that this is achieved if the two side correlations $I_{-1}$ and $I_{+1}$ are equal. Therefore, the DLL is designed such that it adapts the frequency of the local code in such a way that the equality $I_{-1}=I_{+1}$ is verified. As long as the DLL succeeds in doing that, the punctual code $P_0$ is locked on the incoming signal.

Figure 3B:
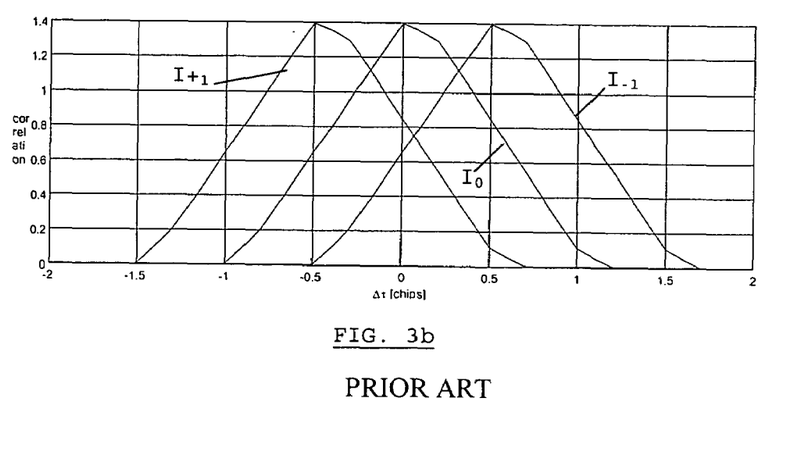

This implementation gives the correct tracking point in absence of multipath. However, when multipath is present, the correlations represented in FIG. 3a do not apply any more. The $I_0$, $I_{-1}$ and $I_{+1}$ correlation values are the sum of the correlation of the local code with the incoming line-of-sight signal and of the correlation of the local code with the incoming multipath signal. The result is that the correlation profile is distorted. FIG. 3b illustrates the distortion of the correlation functions in the case of the presence of one multipath signal having a delay of 60 m, and a fourth of the power of the direct signal, and being in phase with the incoming signal.

It can be seen that the tracking point, defined by the equality $I_{+1}=I_{-1}$, is no longer positioned at Δτ=0. This means that the DLL is not able to correctly align the punctual code and the incoming code. There is a tracking error, which in FIG. 3b is around 0.1 chips, or 30 meters. This tracking error directly translates into an equivalent range error.

The early-late spacing has a large influence on the sensitivity of the DLL to multipath signals. For example, the envelope noted "Narrow spacing" (curve 101) in FIG. 1 corresponds to a spacing of d=0.1 chips. The amplitude of the horizontal parts of the error envelope 101 in FIG. 1 is proportional to d.

The state-of-the-art techniques to reduce the range errors caused by multipath rely on a modification of the DLL so that the deviation of the tracking point with respect to the $\Delta\tau=0$ condition is kept as small as possible in presence of multipath. As discussed above, many prior art techniques are based on a reduction and/or a dynamic adjustment of early-late spacing d, in order to mitigate multipath errors. Others employ elaborate calculation techniques.

The present invention uses a different approach, based on a known fact, namely that the signal amplitude measurement (or equivalently the carrier-to-noise ratio measurement) reported by a receiver is highly correlated with the range error caused by multipath. This is disclosed in the document "Multipath Mitigation, Benefits from Using the Signal-to-Noise Ratio", J. M. Sleewaegen, Proceedings of the ION GPS-97 Meeting, pp. 531–540, 1997. One of the key properties of the signal amplitude measurement is that it is most sensitive to short multipath delays. The present invention makes use of this property to derive a multipath error estimator that is operating even for short multipath delays.

In the invention, a conventional narrow spacing DLL is used for the tracking, i.e. a DLL with a low early-late spacing, for example d=1/15 of a chip length. Tracking is thus performed in the classic way, i.e. by keeping the early and late correlation values equal to each other (see FIG. 3b). At least one additional correlation value is calculated, based on at least one additional replica of the PRN code, shifted in time with respect to the punctual, early and late versions. The multipath errors are estimated a posteriori by an independent multipath estimator module, on the basis of a predefined formula, comprising at least the correlation value between the incoming signal and said at least one additional PRN code replica. The method of the invention yields a minimum impact on the tracking process, and allows to easily turn on or off the multipath estimation process, without modifying the tracking process.

Figure 4:
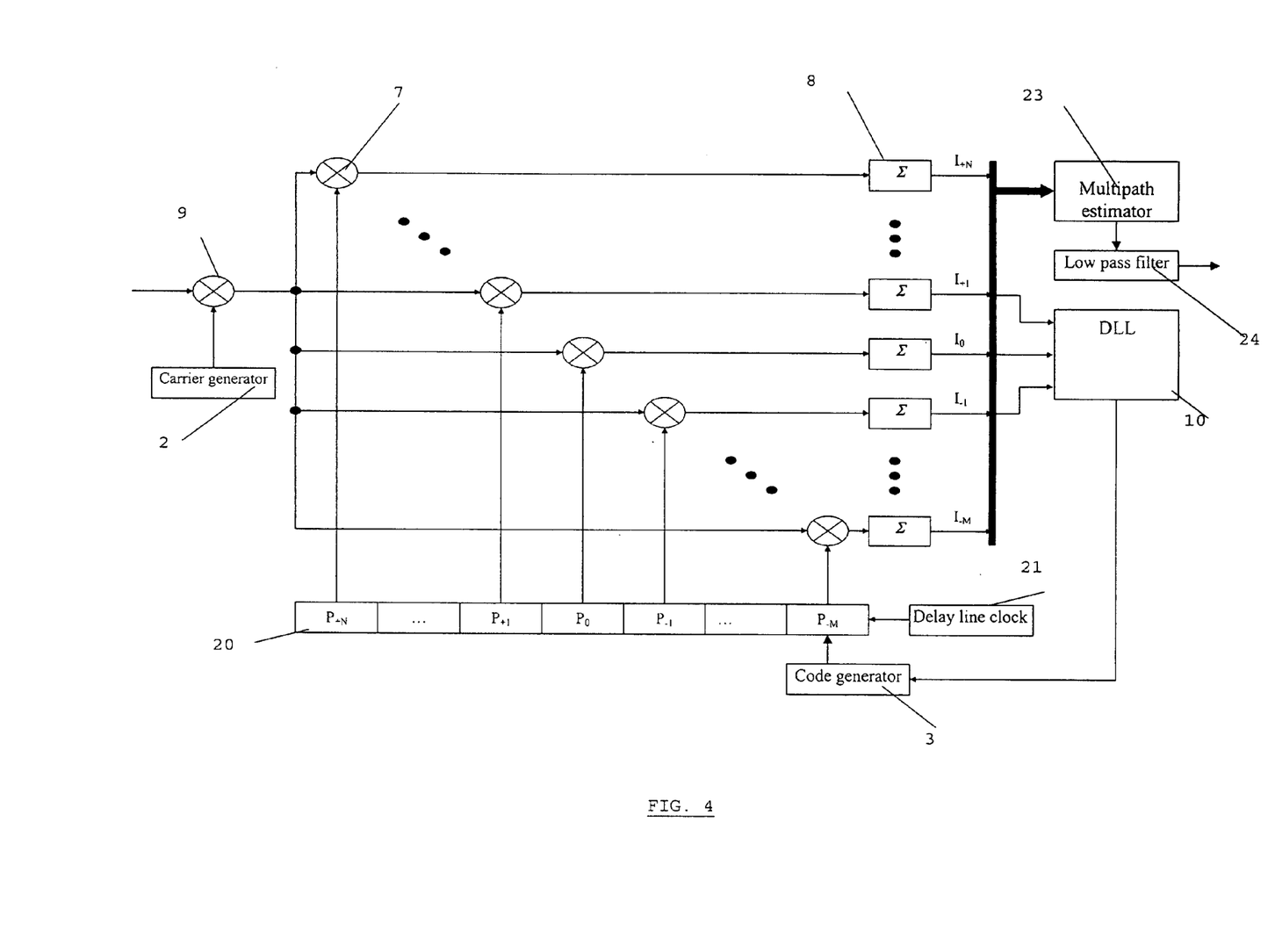
FIG. 4 illustrates the general concept of the method and device of the invention.

FIG. 4 illustrates the method of the invention, and shows equally the characteristic building blocks that need to be present in a receiver according to the invention. In the conventional implementation shown in FIG. 2, the correlation peak is measured at three different points, by providing an early, late and punctual version of the code. In the proposed invention, the correlation peak is measured with respect to the same three versions of the code, and in addition to at least one more version, shifted in time with respect to the first three.

According to the general case presented in FIG. 4, M+N+1 correlation values are computed, namely M early versions ($P_{-M}, \ldots, P_{-1}$), one punctual version ($P_0$), and N late versions ($P_{+1}, \ldots, P_{+N}$). This is done by using a delay line 20 having M+N+1 taps, commanded by a delay line clock 21 and generating M+N+1 versions of the local code. The delay between the taps is still noted d/2, and the delay between tap i and tap 0 is id/2 (i=-M, ..., +N).

As in the prior art receiver, a carrier generator 2 and code generator 3 are used, and a plurality of mixers 7 and accumulators 8. All these elements in themselves are identical to the ones used in the prior art receivers. For the tracking, a conventional DLL discriminator and filter 10 is used, to perform tracking in the classic way, namely based on one early ($P_{-1}$), one punctual ($P_0$) and one late PRN version ($P_{+1}$). Independently, all the M+N+1 correlation values ($I_{-M}, \ldots, I_{+N}$) are fed into the multipath estimator module 23 at each calculation of the range. This module derives M+N+1 independent estimates of the signal amplitude by scaling each of the M+N+1 correlation values by $1/(1-|i|d/2)$, i=(-M, ..., N). When multipath is present, each of these signal amplitude estimates exhibits an error which is highly correlated with the range error, although it is different for each estimate. The invention lies in taking advantage of these differences to build a multipath range error estimator. More specifically, it will be shown that an appropriate linear combination of the M+N+1 signal amplitude estimates, normalized by the punctual correlation value $I_0$ closely matches the ranging error due to multipath. In other words, the range error due to multipath may be closely approximated by the following formula:

$$MP = \sum_{i=-M\ldots N} \alpha_i \frac{1}{I_0} \frac{I_i}{1-|i|\frac{d}{2}}$$

This estimation of the multipath error MP is characteristic to the invention. The coefficients $\alpha_i$ are constant. They are computed only once, during the design of the receiver. After the calculation according to the predefined formula, the noise on the estimation (MP) is filtered out by a low pass filter 24. The result is then subtracted from the range derived from the early-late tracking by the DLL, resulting in largely removing the multipath error from the range measurement.

This predefined formula allows a very fast estimation of the multipath error, compared to existing techniques, in particular compared to the technique presented in U.S. Pat. No. 5,414,729 wherein the multipath error is found at each ranging step, by solving a system of equations. In the method of the invention, no estimation is made of multipath parameters such as delay, phase and amplitude. Only the multipath error itself is estimated.

The coefficients $\alpha_i$ are obtained by a calculation described in hereafter. Multipath range errors and M+N+1 correlation values are simulated for a predefined signal-to-multipath amplitude ratio (SMR), and for different values of multipath delays. Formulas to perform this computation are well documented, for instance in the document "Multipath Mitigation, Benefits from Using the Signal-to-Noise Ratio", J. M. Sleewaegen, Proceedings of the ION GPS-97 Meeting, pp. 531–540, 1997. This simulation can be easily performed using a known calculation software such as Matlab.

The $\alpha_i$'s are found by equating the 'known' simulated multipath range error (expressed in code chips) to a linear combination of the normalized correlation values. The coefficients $\alpha_i$ then become unknowns in a system of equations. It is also possible to set one or more $\alpha_i$'s to zero, thereby excluding the corresponding correlation(s) from the linear combination. At least two $\alpha_i$ values however must not be put to zero.

According to the preferred embodiment, the $\alpha_i$ coefficients are computed using the following method: The multipath error profile is simulated for one particular value of the signal-to-multipath amplitude ratio (SMR), for example 10, and for the worst case conditions where multipath is in phase with the direct signal, and 180 degrees out of phase.

Figure 5:
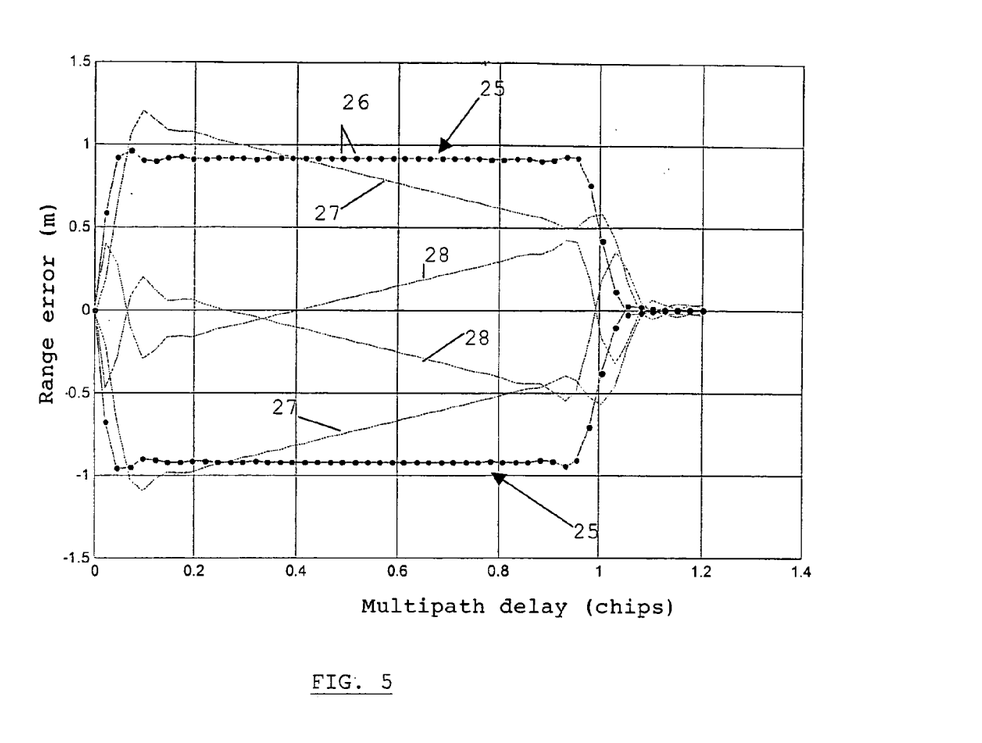
FIG. 5 illustrates the optimization techique used to obtain the coefficients $\alpha_i$.

To cover the whole range of multipath delays, it is sufficient to sample the multipath profile at a given number of D points linearly equally spaced at multipath delays between for example 0 and 1.2 chips. When D=50, this yields 100 samples of the multipath profile: 50 for the in-phase case, and 50 for the out-of-phase case. This is shown in FIG. 5: curve 25 is defined by the samples 26.

Let y be the vector of 100 multipath error samples. For all the corresponding 100 multipath conditions, the correlation values at taps i (i=−M..N) are computed, and normalized by the factor $1/I_0/(1-|i|d/2)$. This yields M+N+1 vectors of 100 normalized correlation values, noted $c_j$ (j=1..M+N+1). Let $C=[c_1\ c_2\ \ldots\ c_{M+N+1}]$ be the matrix [100×(M+N+1)] of correlation samples.

The $\alpha_i$ coefficients are chosen to best fit the vector of multipath estimates $$MP = \sum_{j=-M\ldots N} \alpha_j c_j$$

to the vector of multipath samples y.

In other words, the coefficients $\alpha_i$ are the solution of the system $C\alpha=y$. As $\alpha$ is overdetermined by this set of equations, given that N+M+1 is normally smaller than 100, the solution is obtained by an optimization technique, preferably a least-squares optimization. By removing one or more columns from the C matrix, it is possible to exclude one or more correlations from the linear combination, or equivalently to set the corresponding $\alpha_i$ coefficient to zero.

The curve 27 in the FIG. 5 represents an example of the vector MP after least-squares fitting to the multipath samples of curve 25. The residual error is shown as curve 28. This is the remaining error after application of the invention. In the above description, the values of M and N and the dimension of the vector y can be chosen. The larger these values, the more accurate will be the curve fit.

The optimisation of the $\alpha_i$ coefficients has been performed for a particular value of the SMR, e.g. 10. The invention lies in the finding that computing $\alpha_i$ for other values of SMR yields very similar values. In other words, the $\alpha_i$ coefficients differ little for a wide-range of SMR. This is essential to the invention as it is impossible to predict the SMR without concrete knowledge of the reflecting obstacles.

For instance, taking the example of M=0, N=3 and d=1/15, the $\alpha$ coefficients are shown in the following table for different values of the SMR ranging from 10 to 100. It is assumed that this range of SMR is the most prevailing in a real-life multipath environment:

| SMR | $\alpha_0$ | $\alpha_1$ | $\alpha_2$ | $\alpha_3$ |
| --- | --- | --- | --- | --- |
| 100.0000 | 0.0207 | −0.6541 | 0.6618 | −0.0283 |
| 77.4264 | 0.0196 | −0.6523 | 0.6606 | −0.0280 |
| 59.9484 | 0.0182 | −0.6498 | 0.6591 | −0.0275 |
| 46.4159 | 0.0164 | −0.6466 | 0.6571 | −0.0269 |
| 35.9381 | 0.0140 | −0.6423 | 0.6544 | −0.0261 |
| 27.8256 | 0.0110 | −0.6367 | 0.6507 | −0.0249 |
| 21.5443 | 0.0069 | −0.6292 | 0.6456 | −0.0233 |
| 16.6810 | 0.0017 | −0.6191 | 0.6386 | −0.0211 |
| 12.9155 | −0.0054 | −0.6042 | 0.6264 | −0.0168 |
| 10.0000 | −0.0147 | −0.5836 | 0.6089 | −0.0104 |

The table shows that the absolute variation of the $\alpha_i$'s over the selected SMR range is small.

To be specific, the following linear combination is obtained for M=0, N=3, d=1/15, and based on a SMR of 10:

$$MP = -0.015\frac{I_0}{I_0} - 0.584\frac{I_{+1}}{I_0}\frac{1}{1-d/2} + 0.609\frac{I_{+2}}{I_0}\frac{1}{1-d} - 0.01\frac{I_{+3}}{I_0}\frac{1}{1-3d/2}$$

The case of M=0 is equivalent with the situation wherein M=1 and $\alpha_{-1}$ is set to zero. In a receiver of the invention, there will always be at least one early correlator, one late correlator and one punctual correlator (and at least one additional correlator), so that M and N are at least equal to one, when indicating the number of physical early and late correlators in the receiver. The fact that one or more of the $\alpha_i$ values may be set to zero however allows in the calculation of the range error, to disregard one or more correlation values, in this case $I_{-1}$, so that M=0 for the purpose of calculating MP.

Figure 6A:
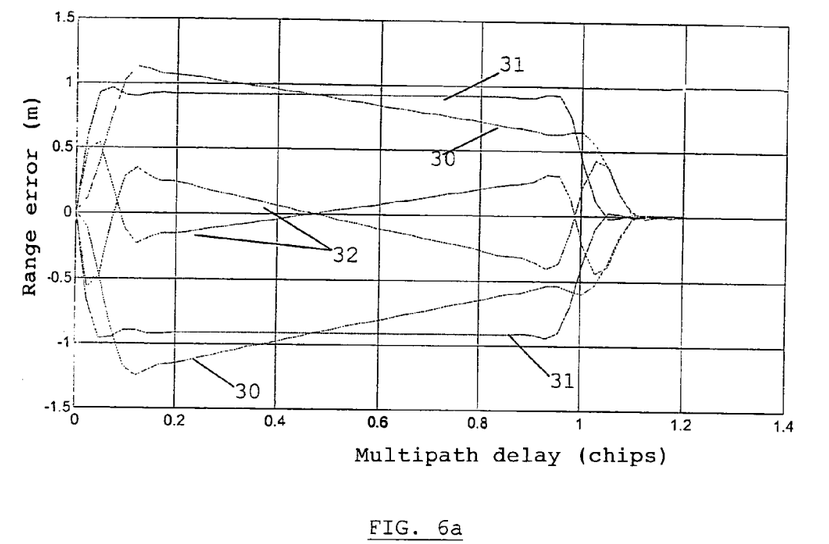
FIGS. 6a and 6b illustrate the principle of the multipath estimator module.
Figure 6B:
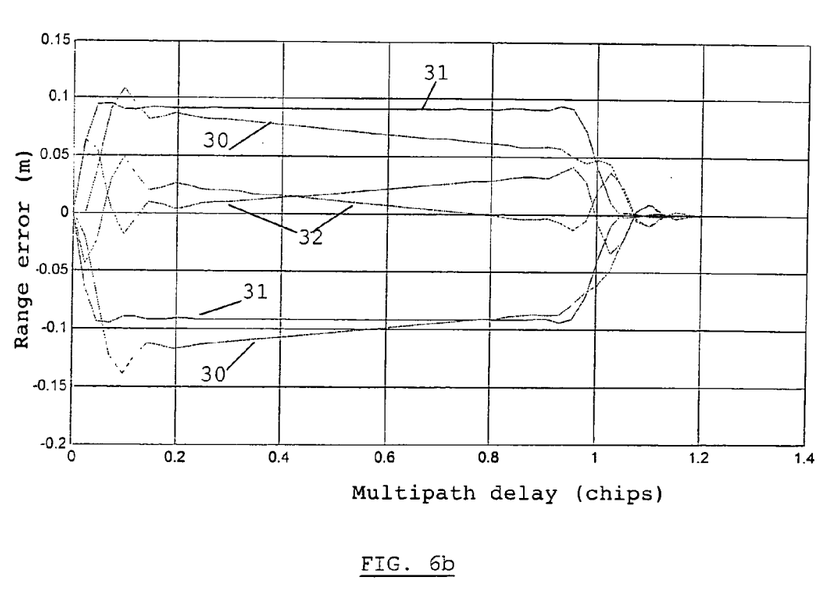

FIGS. 6a and 6b compare the ranging error due to multipath and the estimation of it from the above formula, as a function of the multipath delay, for two different multipath signal amplitudes: 10 and 100 respectively. In FIGS. 6a and 6b, the upper curve corresponds to a multipath component arriving in-phase with the line-of-sight component, the lower curve correspond to a 180° phase shift. It is apparent that the multipath estimate (curves 30) given by the linear combination given above for M=0 and N=3, closely matches the range error (curves 31), even for very short multipath delays. The curves 32 show the residual range error. The $\alpha_i$ coefficients in the above formula have been optimised to best approximate the error from multipath having an SMR of 10 (case of FIG. 6a). However, the same set of coefficients provides a pretty good approximation of the error for other multipath amplitudes (see FIG. 6b, signal-to-multipath amplitude ratio=100).

We can therefore summarize the inventive effect of the invention as follows:

the calculation of the $\alpha_i$ coefficients is insensitive to the SMR value chosen for this calculation. In other words, whether the calculation is based on a SMR of 10 or 100, the $\alpha_i$ values do not change much.

With a given set of a $\alpha_i$ values, calculated on the basis of a particular SMR (e.g. 10), it is possible to estimate multipath errors of a wide range of multipath signals, i.e. signals having a wide range of the SMR.

This allows to conclude that the $\alpha_i$ values can be calculated once during the design of the receiver, based on one SMR value, within the realistic range. An acceptable estimation of range errors due to multipath of different SMR, will be possible using this ONE fixed formula.

The invention is equally related to a receiver, comprising a multipath estimator which calculates the range error based on the linear combination with fixed $\alpha_i$ values as disclosed above.

The design parameters that have to be optimised in the design of the receiver are the number of correlators and $\alpha_i$ coefficients, M+N+1. They result from a trade-off between receiver complexity, accuracy of the multipath error estimation, and noise on the estimation. Generally speaking, using more correlators (needing to increase the number of taps of the delay line) results in being able to better estimate the multipath error, at the expense of receiver complexity, and noise.

As a result, a receiver according to the invention comprises a plurality of channels, each channel being able to detect and lock onto a different PRN encoded signal (from a different satellite). Each channel comprises the elements shown in FIG. 4: a carrier generator 2, carrier signal mixer 9, delay line 20 and delay line clock 21, local code generator 3, the mixers 7 and accumulators 8 for all PRN versions $P_{-M}, \ldots, P_{+N}$, as well as a DLL discriminator and filter 10, designed for 'narrow spacing' type tracking (d<1 chip). The discriminator and filter may be software based applications, producing command signals to be used as inputs for the local PRN code generator 3. A receiver according to the invention is characterised by the presence of the multipath estimator module 23 and the low pass filter 24, wherein the multipath estimator is a means for estimating the multipath ranging error on the basis of a linear combination with predefined fixed $\alpha_i$ coefficients. It is to be understood that these coefficients are preferably obtained during the design of the receiver by the calculation described above. However, small deviations from the optimized values of $\alpha_i$ will still yield good results. This multipath estimator module can be a software application, that performs the action of calculating the estimated multipath error on the basis of the correlation values ($I_{-M}, \ldots, I_{+N}$) and the above formula. The estimator may equally be performed in hardware, such as a semiconductor chip. Also the filter 24 may be a software application or a hardware application.

The invention is equally related to the method per se, already described, of calculating the $\alpha_i$-values on the basis of a simulated signal.

DESCRIPTION OF A PREFERRED EMBODIMENT OF THE INVENTION

Figure 7:
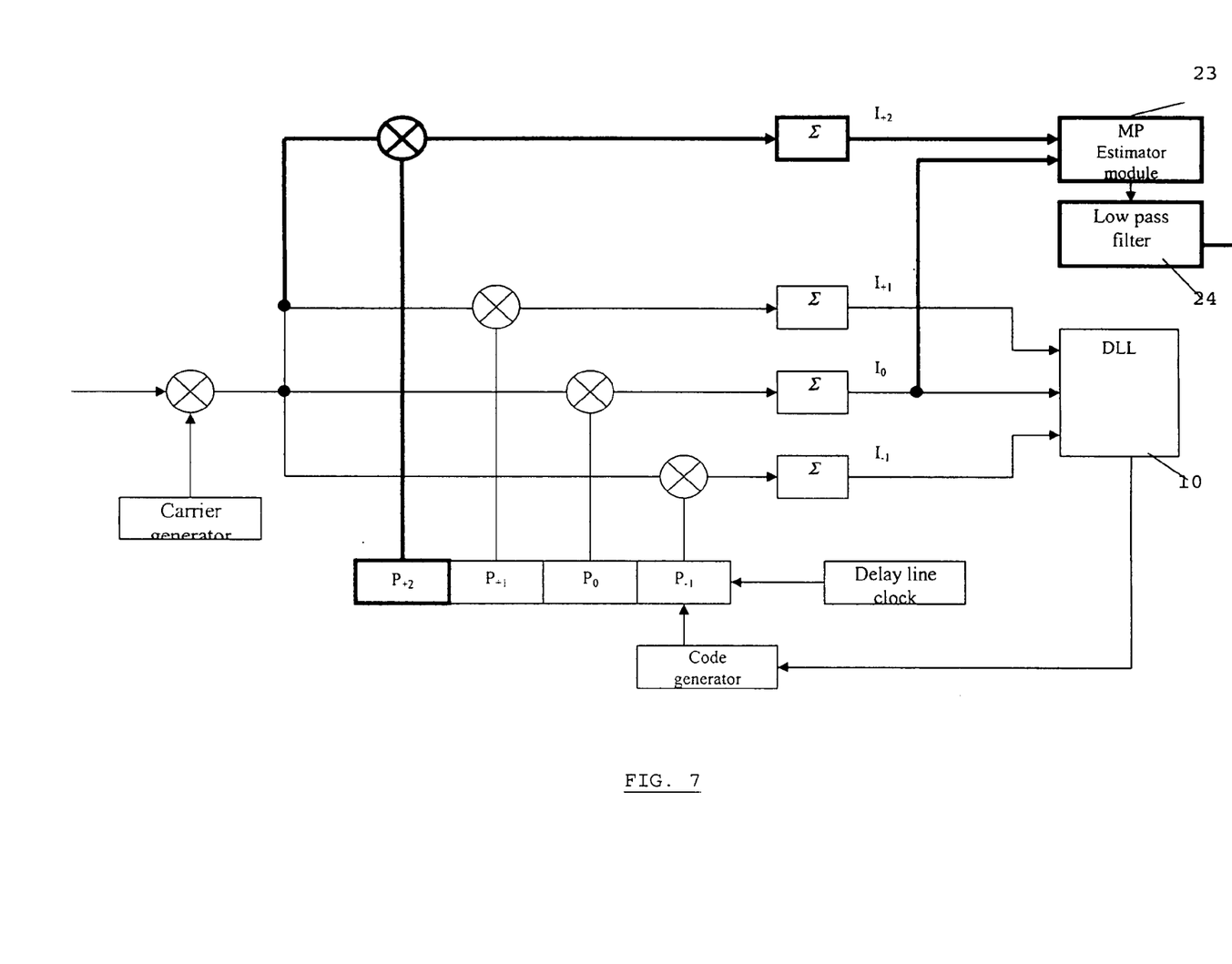
FIG. 7 represents a preferred embodiment of the invention.

Simulations have shown that a good compromise between accuracy of the multipath error estimation and noise on the estimation can be achieved by using only one additional correlator, at position +2 in the delay line (M=1, N=2), i.e. based on a version of the PRN code that is delayed over a time equal to d with respect to the punctual version. The preferred design is represented in FIG. 6. The components printed in bold are the additional components with respect to the conventional receiver. The multipath estimator 23 of FIG. 7 computes the following function of its inputs:

$$MP = -0.42 \cdot \left(1 - \frac{I_{+2}}{I_0} \frac{1}{1-d}\right)$$

The coefficient −0.42 is the result of the optimisation of the $\alpha_i$ parameters described above so that the resulting multipath estimation best fits the actual multipath error in the least-squares sense, for a SMR of 10. In the preferred design, the parameter d is set to $\frac{1}{15}$. The values $\alpha_{-1}$ and $\alpha_{+1}$ have been set to zero in the calculation to obtain the above formula.

The estimation is then fed to a low pass filter 24. In the preferred design, the low pass filter has a noise equivalent bandwidth $B_n$ of 0.1 to 1 Hz.

Figure 8:
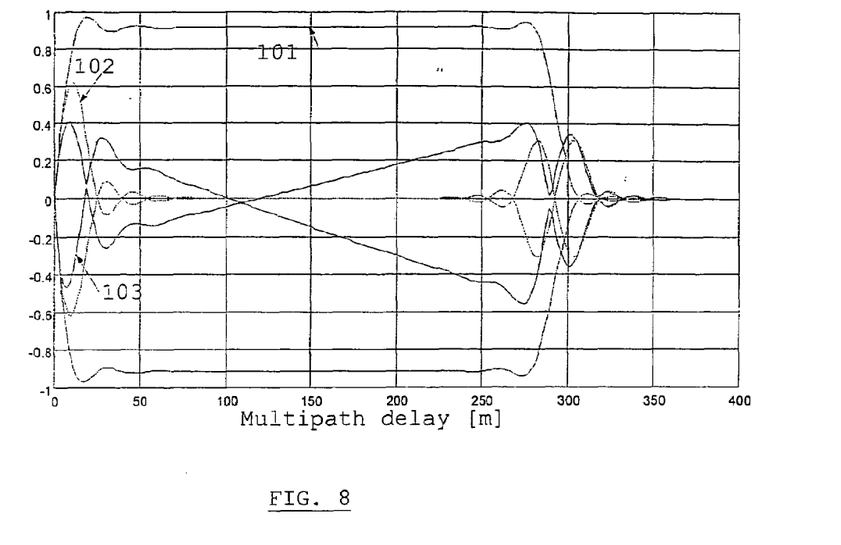
FIG. 8 compares the invention to the prior art in terms of ranging error envelope.

FIG. 8 presents a comparison between the multipath envelopes obtained using a conventional DLL with a narrow spacing of d=$\frac{1}{15}$ chips (curve 101), the techniques representing the closest prior art (curve 102) and the proposed new technique (curve 103). The curves are relative to a signal-to-multipath amplitude ratio of 10. It can be seen that the proposed technique yields the best results for multipath delays shorter than about 20 m. Although the existing techniques perform better for medium to large multipath delays, the new technique yields better results in real life situations because most of the multipath signals fall in the short delay region.

Also, contrary to prior art techniques, the multipath estimation is filtered independently from the range measurement in the low-pass filter 24, allowing to use a low noise equivalent bandwidth $B_n$, and hence to keep the noise on the estimate low. This makes sense because multipath errors typically only contain very low frequency components. As an illustration, it can be demonstrated that the standard deviation of the noise on the preferred multipath error estimator is given by:

$$\sigma_{MP} = 0.42\lambda_C \sqrt{B_n \frac{N_0}{S}} \sqrt{\frac{d(2-d)}{(1-d)^2}}$$

where $\lambda_c$=293 m for the GPS C/A-code. As an example, $\sigma_{MP}$ is only 0.1 m for d=$\frac{1}{15}$, $B_n$=0.1 Hz and a nominal C/N$_0$ of 45 dB-Hz.

Figure 9:
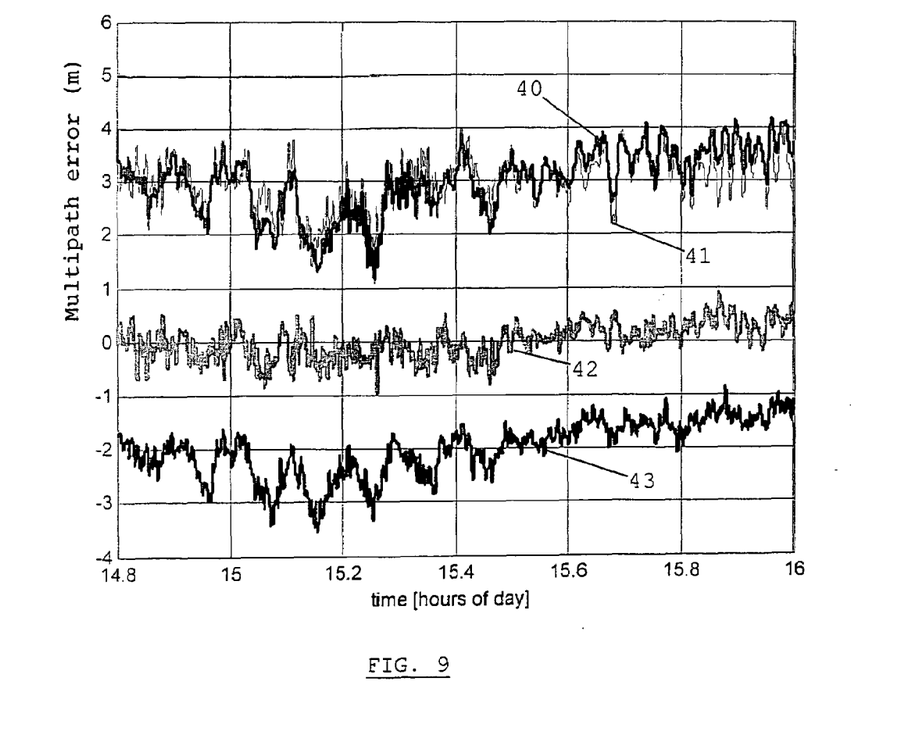
FIG. 9 represents real test data proving the better performance of receiver of the invention.

Finally, some real measurement results are shown in FIG. 9, which is showing pieces of real multipath signals observed during a one-day long experiment. The curve 40 shows the error affecting the narrow correlator tracking, and the estimation through the method of the invention, is shown by curve 41. The corrected measurement is shown by curve 42. Curve 43 shows the corrected measurement from a receiver using the strobe correlator technique disclosed in U.S. Pat. 593,367. Curve 43 is drawn underneath curve 42, but should actually be superimposed onto curve 42. The present way of drawing the curves allows to compare the shape of curves 42 and 43. From this comparison, it is apparent that the curve 42 (invention method) deviates much less from the horizontal than curve 43. This means that the average range error is smaller using the invention method. FIG. 9 illustrates a typical case where long-period multipath occurs, which are often associated with short delays. This is exactly the case wherein the present invention delivers improved results.

A complete analysis of the 24-hour data demonstrated that the method of the invention achieved a reduction of the multipath error by 20% with respect to the narrow-correlator technique, and 5% with respect to the strobe correlator.

The invention claimed is:

1. A method for processing at least one signal sent by a transmitter, said signal preferably being used for measuring the range, i.e. the distance between said transmitter and a receiver, said signal comprising a carrier signal modulated by a pseudo random noise (PRN) code, said method comprising the steps of:
    mixing said signal with a replica of the carrier signal, to acquire a baseband signal, said baseband signal representing said PRN code, multiplying said baseband signal respectively with M+N+1 PRN code replicas ($P_{-M}, \ldots, P_{+N}$), comprising one punctual replica (PO), M early replicas, and N late replicas, said replicas being shifted in time with respect to each other, the value M+N+1 being at least equal to four, calculating the M+N+1 correlation values ($I_{-M}, \ldots, I_{+N}$) of said baseband signal with respect to each of said M+N+1 PRN code replicas, calculating from said M+N+1 correlation values ($I_{-M}, \ldots, I_{+N}$), an estimate of the multipath error, said calculation being based on a predefined formula, said formula equating said multipath error to a predefined linear combination of said M+N+1 correlation values ($I_{-M}, \ldots, I_{+N}$), each of said values being normalized by the correlation value $I_0$ of said punctual replica $P_0$.

2. A method according to claim 1, comprising the steps of:

mixing said signal with a replica of the carrier signal, to acquire a baseband signal, representing said PRN code, multiplying said baseband signal respectively with three equally spaced replicas ($P_0, P_{-1}, P_{+1}$) of said PRN code, namely an early ($P_{-1}$), punctual ($P_0$) and late ($P_{+1}$) replica, with a given early-late spacing (d), multiplying said baseband signal with at least one additional replica of said PRN code, said additional replica being shifted in time relative to said early, late and punctual replicas, so that in total M+N+1 code replicas are used, M+N+1 being at least equal to four, calculating the M+N+1 correlation values ($I_{-M}, \ldots, I_{+N}$) of said baseband signal with respect to each of the M+N+1PRN code replicas, locking the punctual code ($P_0$) to the baseband signal by keeping the two correlation values ($I_{-1}, I_{+1}$) between said baseband signal and said early and late replicas ($P_{-1}, P_{+1}$) equal to each other, calculating the range by multiplying the delay of the punctual code ($P_0$) by the speed of light, calculating from said M+N+1 correlation values ($I_{-M}, \ldots, I_{+N}$), an estimate of the multipath error, said calculation being based on said predefined formula, filtering said estimate of the multipath error and subtracting said estimate of the multipath error from said calculated range, yielding a corrected range value.

3. A method according to claim 1, wherein said linear combination is of the following form:

$$MP = \sum_{i=-M \ldots N} \alpha_i \frac{1}{I_0} \frac{I_i}{1 - |i|\frac{d}{2}}$$

wherein MP represents the multipath error, d represents the early-late spacing, $I_0$ represents the correlation value of said punctual replica, $I_{-M}, \ldots, I_{+N}$ represent the correlation values, $\alpha_i$ represent M+N+1 fixed values.

4. A method according to claim 3, wherein every one of said M+N+1 replicas is shifted over the same time delay with respect to the next and/or previous replica.

5. The method according to claim 3, wherein said $\alpha_i$ values are calculated according to the method comprising the steps of:

simulating, for a fixed signal-to-multipath amplitude ratio and for different multipath delays, the multipath range error and M+N+1 correlation values, using said simulated range errors and correlation values to obtain a system of equations, each equation equating the simulated multipath range error to a linear combination of the M+N+1 correlation values, obtaining said $\alpha_i$ values by solving said system of equations.

6. The method according to claim 5, wherein all except two of said $\alpha_i$ values may be set to zero.

7. The method according to claim 6, wherein said $\alpha_i$ values are calculated according to the method comprising the steps of:

for a given signal-to-multipath amplitude ratio SMR and for a given number D at multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ a of said punctual replica $P_0$, to obtain a (2D×(M+N+1)) matrix C, calculating the $\alpha_i$ values by solving the system of equations y=C·α, wherein α is a vector comprising the M+N+1 $\alpha_1$ values.

8. The method according to claim 7, wherein the vector α is overdetermined by said system of equations and wherein said vector α is obtained by an optimization technique.

9. A method according to claim 3, wherein two replicas are used in the estimation of the multipath error by setting $\alpha_{-1}$ and $\alpha_{+1}$, by setting $\alpha_{-1}$ and $\alpha_{+1}$ equal to zero, and wherein the early-late spacing (d) is 1/15 of a chip length, and wherein the second replica ($P_{+2}$) is 1/15 of a chip length later than said punctual replica ($P_0$), and wherein said multipath error estimation (MP) is calculated as:

$$MP = -0.42 \cdot \left(1 - \frac{I_{+2}}{I_0} \frac{1}{1-d}\right)$$

10. A receiver for ranging applications, said receiver comprising a plurality of channels for detecting and locking onto a plurality of PRN encoded signals, each channel comprising:

a delay line, comprising M+N+1 taps, M+N+1 being at least four, for obtaining M+N+1 PRN codes, one of which is a punctual code $P_0$, one a first early code P−1, and one a late code P+1, with an early-late spacing d between the early and late code, M+N+1 mixers and M+N+1 accumulators to calculate M+N+1 correlation values ($I_{-M}, \ldots, I_{+N}$), a multipath estimator module arranged to receive said M+N+1 correlation values, and to calculate a multipath error estimate MP, according to a predefined linear combination of said M+N+1 correlation values ($I_{-M}, \ldots, I_{+N}$), each of said values being normalized by the correlation value $I_0$ of said punctual replica $P_0$, a low pass filter arranged to receive the multipath estimation produced by the multipath estimator module.

11. The receiver according to claim 10, wherein said formula has the form:

$$MP = \sum_{i=-M \ldots N} \alpha_i \frac{1}{I_0} \frac{I_i}{1 - |i|\frac{d}{2}}$$

wherein MP represents the multipath error, d represents the early-late spacing, $I_0$ represents the correlation value of said punctual replica, $I_{-M}, \ldots, I_{+N}$ represent the correlation values, $\alpha_i$ represent M+N+1 fixed values.

12. The receiver according to claim 11, wherein said $\alpha_i$ values are calculated by simulating the multipath range error and M+N+1 correlation values, for a fixed signal-to-multipath amplitude ratio and for different multipath delays using said simulated range errors and correlation values to obtain a system of equations, each equation equating the simulated multipath range error to a linear combination of the M+N+1 correlation values, obtaining said $\alpha_i$ values by solving said system of equations.

13. The receiver according to claim 12, wherein said $\alpha_i$ values are calculated by:

for a given signal-to-multipath amplitude ratio SMR and for a given number D of multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ of said punctual replica $P_0$, to obtain a (2D×(M+N+1)) matrix C, calculating the $\alpha_i$ values by solving the system off equations y=C·$\alpha$, wherein $\alpha$ is a vector comprising the M+N+1 $\alpha_i$ values.

14. The receiver according to claim 13, wherein the vector $\alpha$ is overdetermined by said system of equations and wherein said vector $\alpha$ is obtained by an optimization technique.

15. The receiver according to claim 11, wherein two replicas are used in the estimation of the multipath error by setting $\alpha_{-1}$ and $\alpha_{+1}$, by setting $\alpha_{-1}$ and $\alpha_{+1}$ equal to zero, and wherein the early-late spacing (d) is 1/15 of a chip length, and wherein the second replica ($P_0$) is 1/15 of a chip length later than said punctual replica ($P_0$), and wherein said multipath error estimation (MP) is calculated as $$MP = -0.42 \cdot \left(1 - \frac{I_{+2}}{I_0} \frac{1}{1-d}\right)$$

16. The receiver according to claim 10, wherein said multipath estimator module comprises software means for calculating the multipath error estimate on the basis of a predefined formula.

17. The receiver according to claim 10, wherein said multipath estimator module comprises hardware means for calculating the multipath error estimate on the basis of a predefined formula.

18. A method for estimating a ranging error due to multipath in a receiver, the method comprising:

providing a receiver including:

a delay line, comprising M+N+1 taps, M+N+1 being at least four, for obtaining M+N+1 PRN codes, one of which is a punctual code $P_0$, one an early code $P_{-1}$, and one a late code $P_{+1}$, with an early-late spacing d between the early and late code, M+N+1 mixers and accumulators to calculate M+N+1 correlation values $(I_{-M}, \ldots, I_{+N})$, a multipath estimator module to calculate a multipath error estimate (MP), according to the formula $$MP = \sum_{i=-M\ldots N} \alpha_i \frac{1}{I_0} \frac{I_i}{1-|i|\frac{d}{2}}$$

wherein MP represents the multipath error, d represents the early-late spacing, $I_0$ represents the correlation value of said punctual replica, $I_{-M}, \ldots, I_{30\ N}$ represent the correlation values, $\alpha_i$ represent M+N+1 fixed values;

simulating the multipath range error and M+N+1 correlation values the multipath range error and M+N+1 correlation values, for a fixed signal-to-multipath amplitude ratio and for different multipath delays, using said simulated range errors and correlation values to obtain a system of equations, each equation equating the simulated multipath range error to a linear combination of the M+N+1 correlation values, obtaining said $\alpha_i$ values by solving said system of equations.

19. The method according to claim 18 comprising the steps of:

for a given signal-to-multipath SMR and for a given number D of multipath delays, calculating the range error, for multipath in phase with a simulated line-of-sight signal and for multipath 180° out of phase with said simulated line-of-sight signal, thereby obtaining a vector y comprising 2D range error values, calculating, for each of the 2D range errors, the M+N+1 correlation values, and normalizing said correlation values by the correlation value $I_0$ of said punctual replica $P_0$, to obtain a (2D×(M+N+1)) matrix C, calculating the $\alpha_i$ values by solving the system of equations y=C·$\alpha$, wherein $\alpha$ is a vector comprising the M+N+1 $\alpha_i$ values.

* * * * *